Oct. 6, 1942.  E. H. YONKERS, JR  2,297,933
SUCTION CLEANER
Filed April 22, 1940
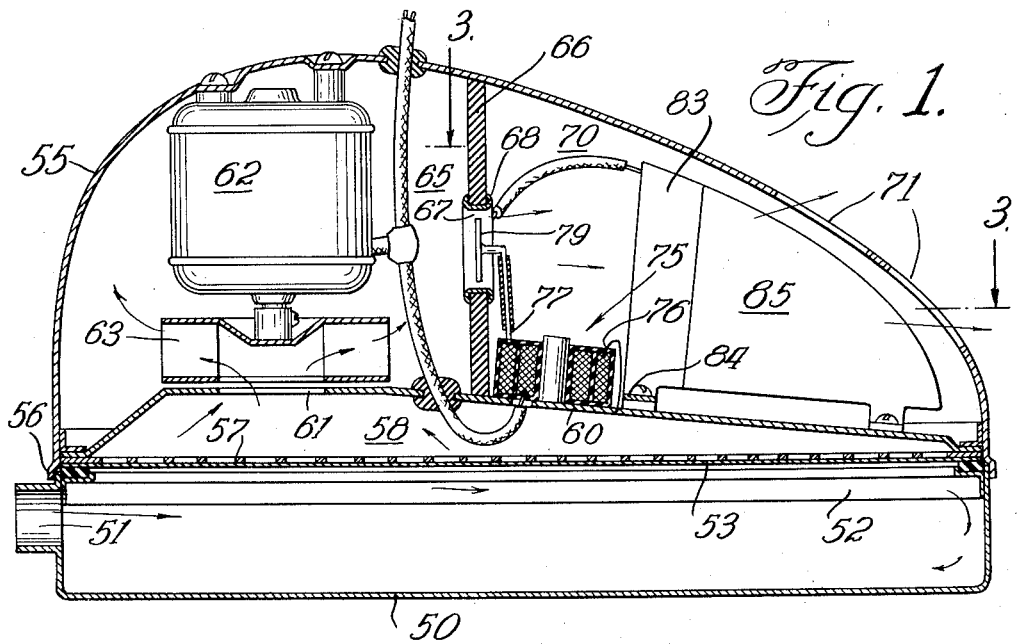
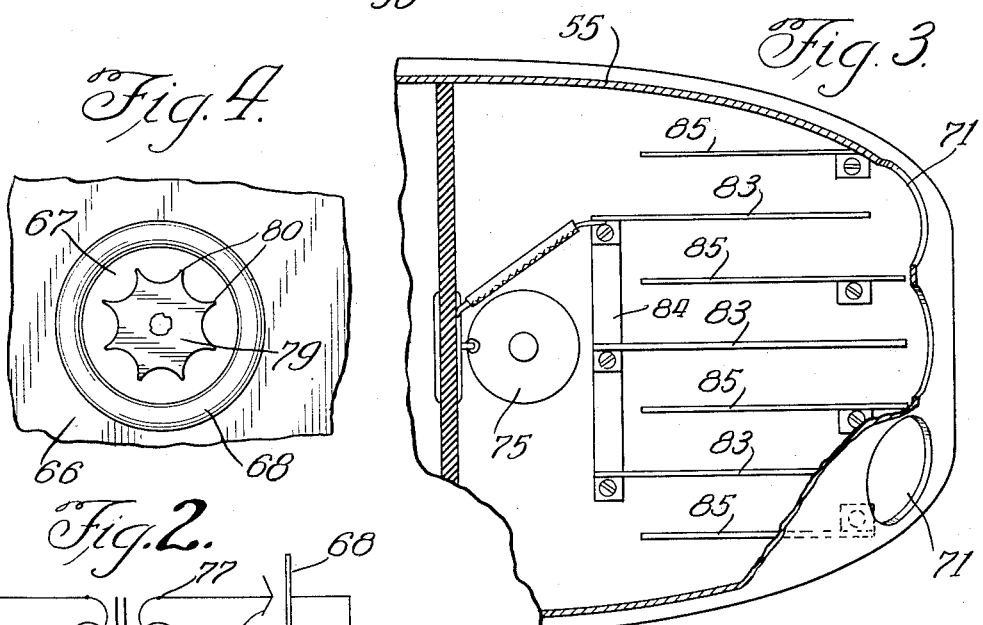
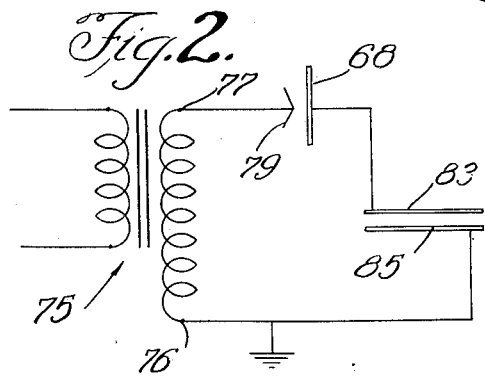
Inventor:
Edward H. Yonkers, Jr.
By Robert L. Kahn Atty.

Patented Oct. 6, 1942

2,297,933

UNITED STATES PATENT OFFICE 2,297,933

SUCTION CLEANER

Edward H. Yonkers, Jr., Glencoe, Ill.

Application April 22, 1940, Serial No. 330,914

3 Claims. (Cl. 183—7)

This invention relates to a combined suction cleaner, dust precipitator and ozonizer and has particular application in connection with suction cleaners for domestic purposes and the like. A suction cleaner includes as one of the elements thereof a filter which permits air to pass through but which is supposed to stop dust and dirt. Obviously, however, any filter will permit the passage therethrough of some dust particles. In the case of a conventional woven cloth filter such as is used in many of the present day types of suction cleaners, dust of substantial size can pass through. This is in spite of the filtering effect of the woven fabric and whatever dirt may be piled up againt the interior surface of the fabric.

In my Patent 2,198,568 granted April 23, 1940, I have disclosed a suction cleaner of the type using a porous paper as a filtering element. In this cleaner, the paper preferred is sold in the trade under the name "Dextilose." This paper is of substantially pure cellulose having long fibers extending in all directions and thoroughly matted together. The porosity of the paper is uniform with regard to dispersion of the pores. The pores in this paper are extremely small, between 10 and 50 microns. By virtue of the operation of my suction cleaner, the filtering load on the paper is reduced to a minimum. However, it is possible that dust particles of microscopic dimensions may pass through this paper.

Thus, it is evident that the use of a conventional suction cleaner with a fabric filter inherently results in the stirring up and scattering of dust of substantial size in the air. Some extremely fine dust may also be scattered by a cleaner having a paper filter.

The presence of dust in air in a room is highly objectionable, primarily for sanitary reasons. While air under normal restful conditions contains a certain amount of dust, the rapid circulation of air induced by suction cleaning may raise the dust concentration to such a high degree as to render colds and respiratory disturbances likely. In accordance with this invention, I eliminate such dust during suction cleaning.

In general, this invention contemplates electrically charging dust particles that have passed through a filter in a suction cleaner. By virtue of the charge on the dust, a tendency develops for the dust to settle on an oppositely charged surface. Such surface may be either the suction cleaner machine itself, usually having a metal housing, or the walls of the room.

It is also possible to ozonize the air to a sensible degree. This ozonization tends to freshen the air and introduce a sufficiently large number of ions to simulate outdoor conditions. Ozonization further tends to oxidize any objectionable odors and has some germicidal effect.

Referring to the drawing:

Figure 1 is a sectional elevation of a suction cleaner provided with an ozonizer and dust precipitator;

Fig. 2 is a circuit diagram of the system of Fig. 1;

Fig. 3 is a view on line 3—3 of Fig. 2;

Fig. 4 is a detail of the ozonizer and rectifier.

Referring to Figs. 1, 3 and 4 inclusive there is shown a dust pan 50 preferably having the depth small in comparison to the length thereof. Thus dust pan 50 has an inlet 51 for supplying dirt-laden air. A frame 52 is disposed around the edge of the pan 50 near the top thereof and is adapted to support a paper filter 53. Removably disposed on pan 50 is the entire cover 55 carrying the various pieces of apparatus. Cover 55 has a lip 56 which fits over the rim of pan 50 to form an air-tight seal therewith. The cover carries a perforated rigid backing member 57 which is adapted to bear against paper filter 53. Above backing member 57 is a low pressure region 58, this region being bounded by backing member 57 and filter 53 as one wall and a sheet metal partition 60 having an aperture 61 therein.

Cover 55 carries an electric motor 62 and a blower 63, the blower being disposed over aperture 61 and adapted to suck air from low pressure region 58 and discharge the air into chamber 65 in which the motor and blower are located. This chamber 65 is formed in part by cover 55 and in part by partition 60 and also by a partition 66 of insulating material.

Partition 66 has a discharge aperture 67 bounded by a smooth metal electrode 68 rolled around the edge thereof. To the right of partition 66, as seen in Fig. 1, is a chamber 70 enclosed by a portion of partition 60 and partition 66 and cover 55. Cover 55 has a plurality of louvres 71 whereby chamber 70 may communicate with the outside atmosphere.

The ozonizing and dust precipitating means comprises a high tension transformer 75 mounted upon metal partition 60 or any other spot in any suitable fashion and having a primary winding energized from the alternating current supplied to motor 62. The high tension winding has its terminals 76 and 77 connected respectively to ground (partition 60) and to a star-shaped electrode 79 disposed within ring electrode 68 and spaced therefrom. Star-shaped electrode 79 has a plurality of sharp points 80 formed thereon. These two electrodes may be formed of any suitable metal such as aluminum, brass, iron, or the like.

Mounted insulatingly upon partition 60 in chamber 70 is one series of metal plates 83 connected mechanically and electrically by a metal tie bar 84, the latter being connected by an insulated wire to smooth electrode 68. Interleaved with plates 83 is a series of metal plates 85 directly mounted on partition 60 and thus being grounded.

Referring now to Fig. 2, plates 83 and 85 form a condenser load for the rectifier. Transformer 75 has its secondary potential at a sufficiently high value for breakdown to occur at the rectifier in one direction only. When breakdown at the rectifier contacts occurs, a small charging current is supplied to the condenser load. The discharge at the rectifier contacts is extinguished when the potential across it is insufficient to support it. This will happen when the condenser is fully charged unless the capacity is so large that the charging period is longer than the duration of peak potential. This latter possibility does not ordinarily exist in such a condenser.

The potential across the rectifier electrodes should be such that a corona or brush discharge will develop only from the pointed electrode. On reverse potential, no brush discharge should occur. Under these conditions rectification occurs.

A discharge of this nature is rich in ions and these, being relatively massive, will exist as such for an appreciable time. Such ions readily attach themselves to dust particles and thus result in the particle being charged.

The blast of filtered air is directed through this discharge region in order to bring the ions and dust particles together as much as possible. It is true that the removal of ions from the discharge has a tendency to blow out the electric discharge but a sufficiently high potential will maintain the discharge under these conditions.

The air with charged dust particles passes on between the oppositely charged condenser plates. At this region the air moves relatively slowly. Some dust particles will be precipitated on the plates, some on the metal housing and some may go out into the room and drift toward the walls or other solids. There will also be some ozone generated by the brush discharge that gets out into the room.

The brush discharge in the apparatus serves several useful purposes. One is the generation of ions as part of dust precipitation. The other is rectification of high voltage alternating currents for precipitating condenser. The third is the generation of ozone and ultra-violet rays in the discharge, both of which have germicidal action. The later is important during suction cleaning since germs and odors are apt to be stirred up.

What is claimed is:

1. In combination, a suction cleaner having an air permeable filter through which air and some dust passes, a chamber through which the filtered air passes on the way to atmosphere, a pair of electrodes in the air path to said chamber, one electrode having a smooth surface and the other electrode having sharp pointed edges, an air condenser having plates in said chamber disposed in the path of air flow, a connection from one condenser terminal to said smooth electrode and means for impressing high potential alternating currents on said other condenser terminal and said sharp electrodes, said potentials being high enough so that a point to plate rectifying discharge occurs.

2. The structure of claim 1 wherein said suction cleaner includes a metal housing enclosing the entire apparatus and forming a ground connection.

3. The structure of claim 1 wherein said air permeable filter is of paper having pores therethrough of the order of 50 microns or less.

EDWARD H. YONKERS, JR.